(12) United States Patent
Patterson et al.

(10) Patent No.: US 7,882,879 B2
(45) Date of Patent: Feb. 8, 2011

(54) APPARATUS FOR BONDING RUBBER O-RINGS AND EXTRUSIONS

(76) Inventors: Paul Stuart Patterson, 129 Plumtrees Rd., Bethel, CT (US) 06801; George Everett Warrin, 914 Madison Pl., Merrick, NY (US) 11566

( * ) Notice: Subject to any disclaimer, the term of this patent is extended or adjusted under 35 U.S.C. 154(b) by 354 days.

(21) Appl. No.: 12/220,547

(22) Filed: Jul. 26, 2008

(65) Prior Publication Data
US 2010/0018651 A1    Jan. 28, 2010

(51) Int. Cl.
*B32B 37/00* (2006.01)
(52) U.S. Cl. .............. 156/358; 156/359; 156/366; 156/502; 156/581; 156/583.1; 156/583.8
(58) Field of Classification Search .............. 156/64, 156/228, 350, 351, 358, 359, 366, 580, 581, 156/583.1, 583.4, 502, 583.8, 583.9; 700/299, 700/300, 301, 306
See application file for complete search history.

(56) References Cited

U.S. PATENT DOCUMENTS

| | | | | |
|---|---|---|---|---|
| 3,026,569 A | * | 3/1962 | Keller | 264/148 |
| 4,207,135 A | * | 6/1980 | Pavano | 156/502 |
| 4,352,712 A | * | 10/1982 | Paul | 156/540 |
| 5,879,503 A | * | 3/1999 | McDunn et al. | 156/304.2 |
| 6,276,419 B1 | * | 8/2001 | Maruyama | 156/358 |
| 6,755,936 B2 | * | 6/2004 | Eile et al. | 156/583.1 |

* cited by examiner

*Primary Examiner*—James Sells

(57) ABSTRACT

Apparatus for bonding rubber O-Rings from cord stock, rubber extrusions and extruded tubing materials, consists of heated die-sets, holding fixtures, electronic module, assembly device, spring clamping and pneumatic clamping arrangement. The combined heated die-set and holding fixture are two separable heat conductive blocks having a common interface. Apertures are located across the interface having diameters or matching shapes of extrusions, these apertures are slightly less than the cord or extrusion dimensions, the rubber is axially mated in the open heated aperture, and will stay unlovable when the clamping device is closed. The electronic module controls both a heating and timing device for proper control of maintaining a constant temperature and accurate timing cycle.

20 Claims, 11 Drawing Sheets

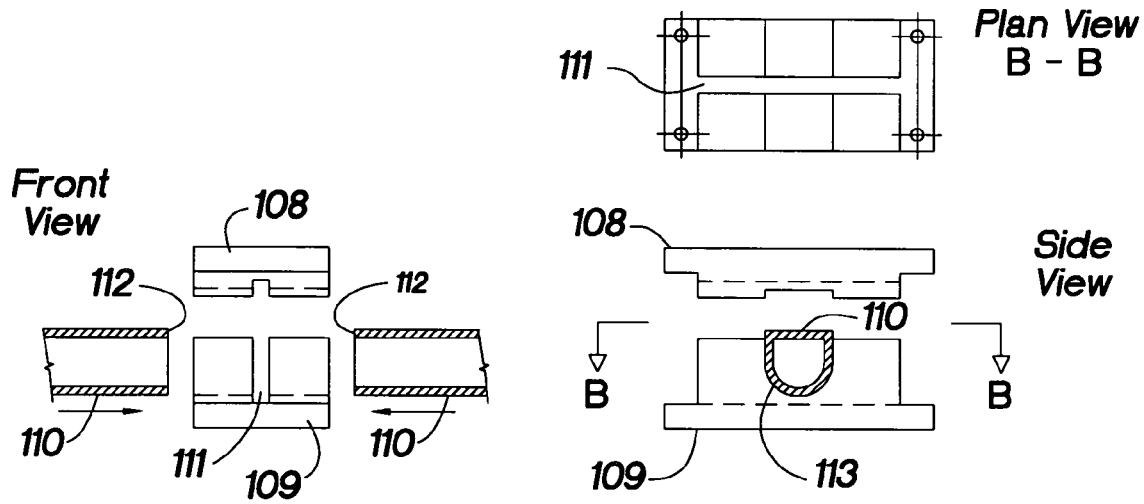
Fig. 10A
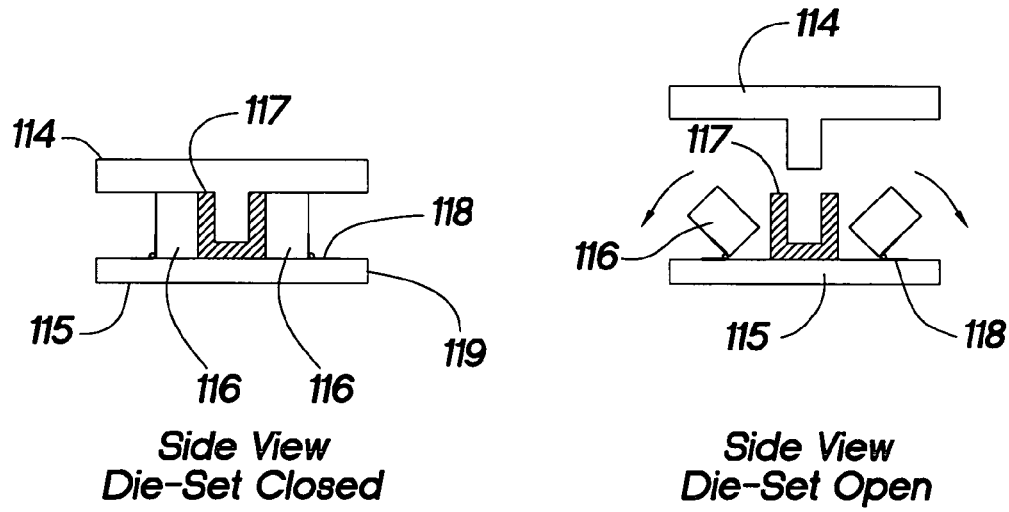
Side View
Die-Set Closed
Side View
Die-Set Open
Fig. 10B
Fig. 10C

APPARATUS FOR BONDING RUBBER O-RINGS AND EXTRUSIONS

CROSS-REFERENCE TO RELATED APPLICATIONS

| U.S. Patent Documents | | |
|---|---|---|
| 3,026,569 | March 1962 | Keller |
| 4,207,135 | June 1980 | Pavano |

DESCRIPTION OF PRIOR ART

The manual fabrication of O-Rings using heated holding fixtures is well known and widely accepted in the sealing industry. A "Method of Fabricating O-Rings" is disclosed in U.S. Pat. No. 3,026,569 to Keller. This method uses the overlapping of materials and then causing the O-Ring to cure in a special mold. The Keller method discloses the use of uncured rubber in fabricating O-Rings. A "Kit Apparatus for Making O-Rings" is disclosed in U.S. Pat. No. 4,207,135 to Pavano. This method discloses holding fixtures allowing cord material to be cut diagonally. This method employs manual use of holding fixtures, for cutting rubber and clamping in the heated mold blocks. A heating element is used in the lower portion of the larger mold block. Guide pins assist in maintaining upper and lower mold blocks in alignment, while the locking bolts are tightened.

BACKGROUND OF THE INVENTION

The present invention pertains to apparatus for semi-manual operation of a pneumatic system for large parts, and a portable system primarily for small parts. More particularly, it pertains to bonding of rubber O-Rings and extrusions, utilizing solid state temperature controlled die-sets that confine the rubber material while the bonding compound cures.

BRIEF SUMMARY OF THE INVENTION

One purpose of the invention is to provide means of bonding rubber cord stock or extrusions into circular rings, using heated dies, holding fixtures and pneumatic bench mounted assembly apparatus. An alternate of the invention is a small and portable assembly apparatus to make bonding of rings of smaller size and easily used in confined spaces or easily stored for emergency use. The design incorporates proportional type temperature controllers that stabilize temperature better because the design is such so as not to overshoot the set point. The design also uses aluminum dies that distribute and transfer heat to the bonding dies, maintaining an even heat distribution. The design includes size compensation of the rubber product being bonded, by a pneumatic closure of the dies, the alternate invention has spring loading to maintain die closure. The design comprises quick change dies that allow effortless switching to an alternate size or shape configuration. The invention allows use of numerous style die designs, from small quick change dies to large dies with multiple heaters. The design has two basic uncomplicated modules; the mechanical structure for perpendicular motion of the dies, and electronic control box for management of; die temperature, timing cycle, means to alter the force of die closure and initiate the pneumatic system. The invention incorporates safety controls to enable instant retraction of the dies by pneumatic function by opening the closed die system.

BRIEF DESCRIPTION OF THE SEVERAL VIEWS OF THE DRAWINGS

FIG. 10A pictures die-sets for use with irregular rubber extrusions.
FIGS. 10B and 10C illustrates a die-set with moveable side walls, used for a custom designed rubber extrusion.

DETAILED DESCRIPTION OF THE INVENTION

During the course of this description, like numbers will be used to indicate like elements in the different views illustrating the invention.

Figure 1:
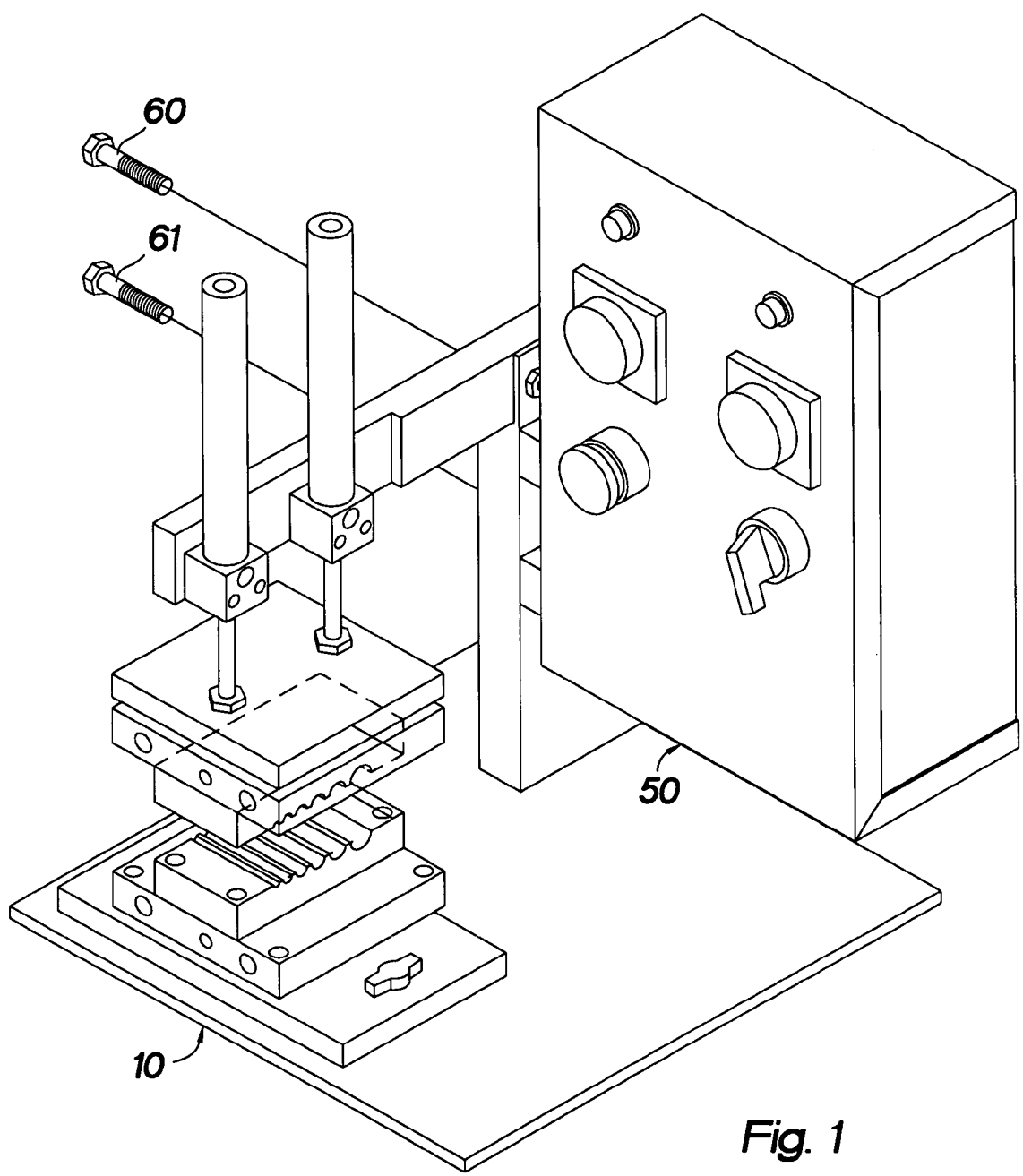
FIG. 1 is a perspective view of the control module attached to the press apparatus.

FIG. 1 illustrates the perspective view of the invention with Electronic Control Module 50, securely fastened to the Press Apparatus 10, using attaching means 60 and 61.

Figure 2:
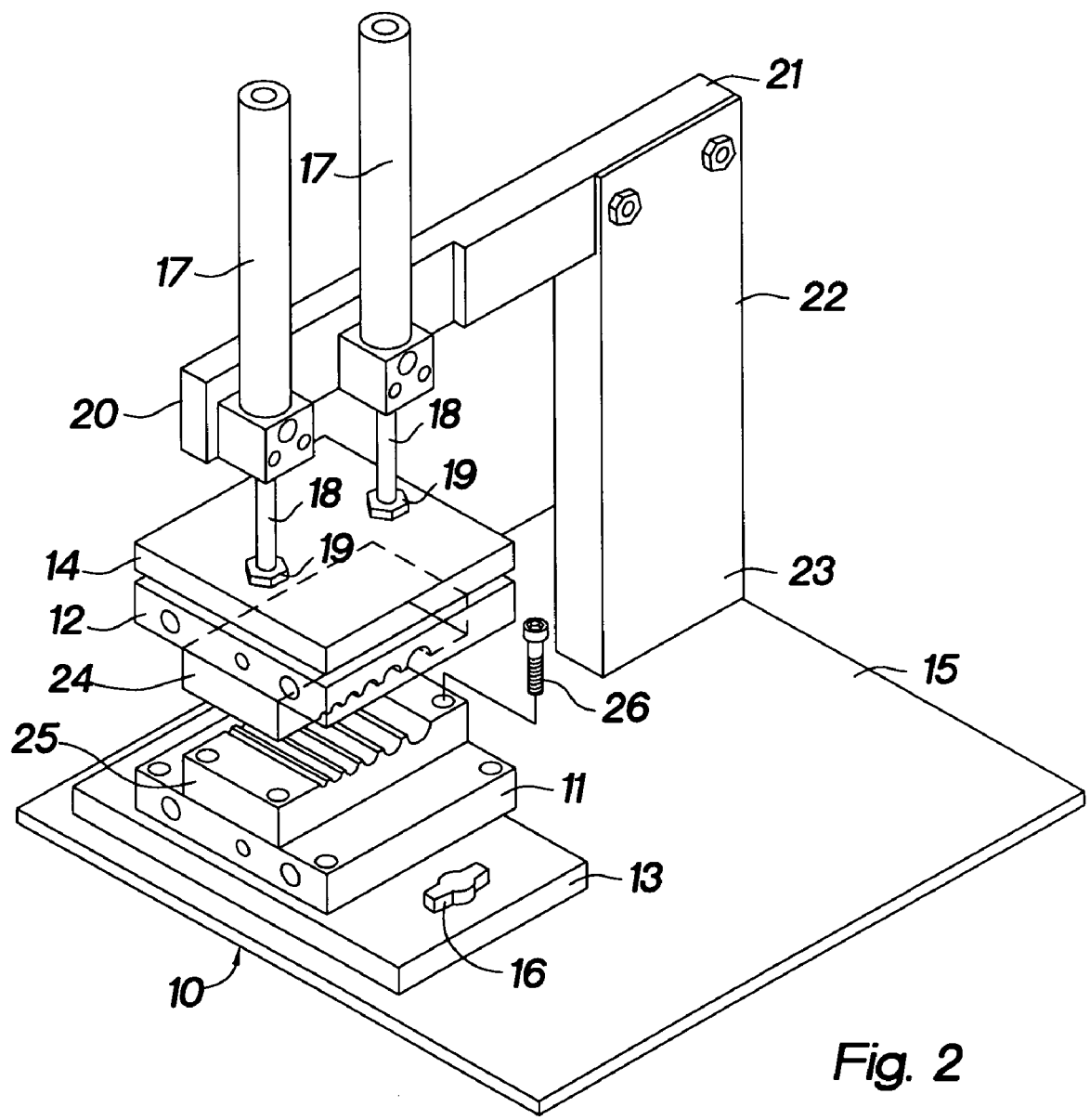
FIG. 2 is a perspective view of the press apparatus.

FIG. 2 illustrates the basic elements of the Press Apparatus 10, heater blocks 11 and 12 are attached to lower plate 13 and upper plate 14. The lower plate 13 is attached to base plate 15 with thumb screw fasteners 16. The design incorporates air operated cylinders 17, the upper plate 14 is attached to the moveable rods 18 of the cylinders 17, with locking style nuts 19. The air operated cylinders 17 are securely attached to horizontal arm 20, the opposite end 21 of horizontal arm 20 is connected to vertical column 22. The opposite end 23 of the vertical column 22 is fastened to the base plate 15. Die-set top 24 and die-set bottom 25 are attached to heater blocks 12 and 11 with a plurality of hardware 26.

Figure 3:
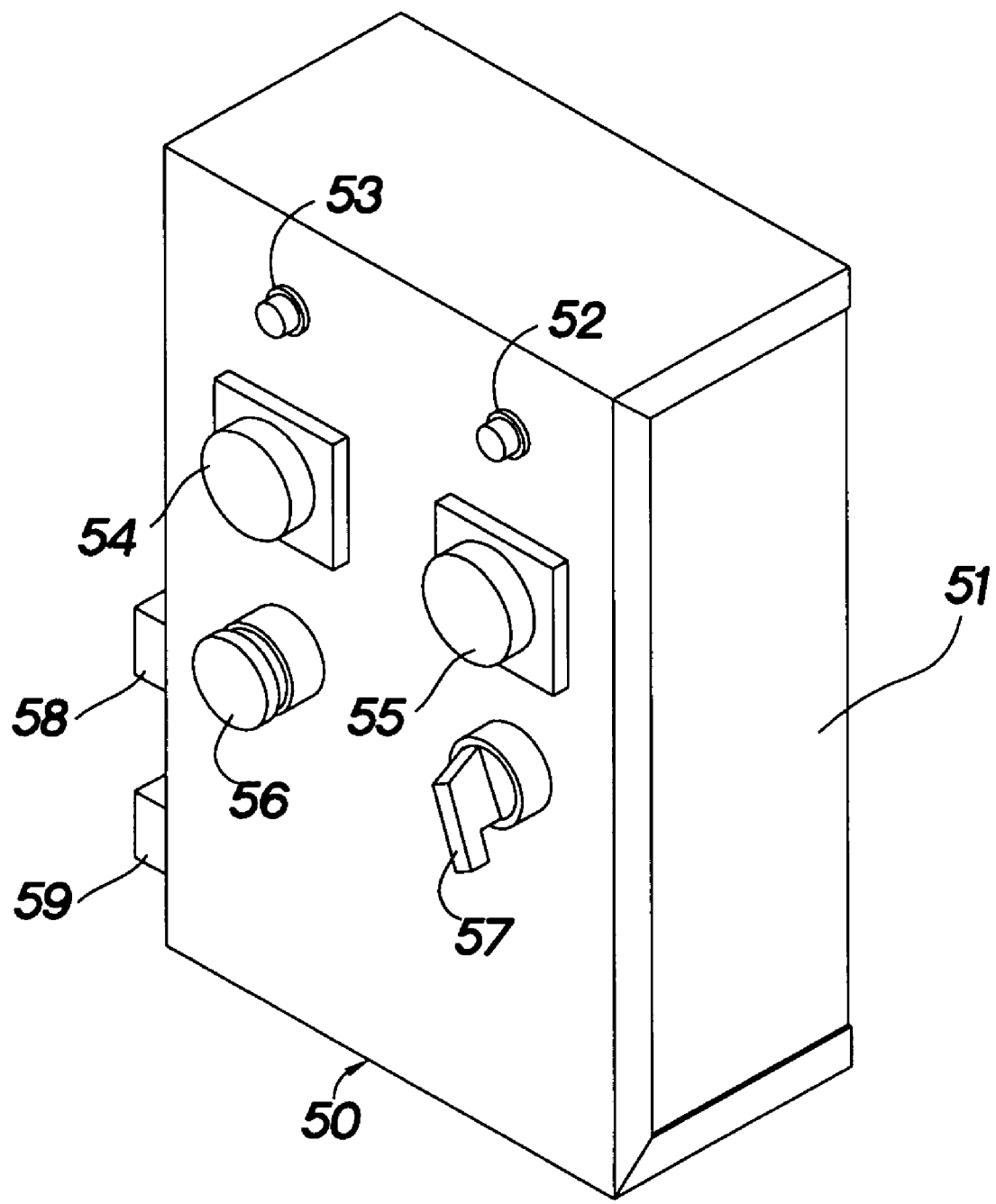
FIG. 3 is a perspective view of the control module.

FIG. 3 illustrates the basic elements of the Electronic Control Module 50, enclosure 51 houses the power indicator light 52, press up indicator light 53, temperature setting dial 54, time setting dial 55, open die push button 56, and off-on selector switch 57. On the side of enclosure 51 are mounting bar 58 and mounting bar 59, for the attachment means to the Press Apparatus 10.

Figure 4:
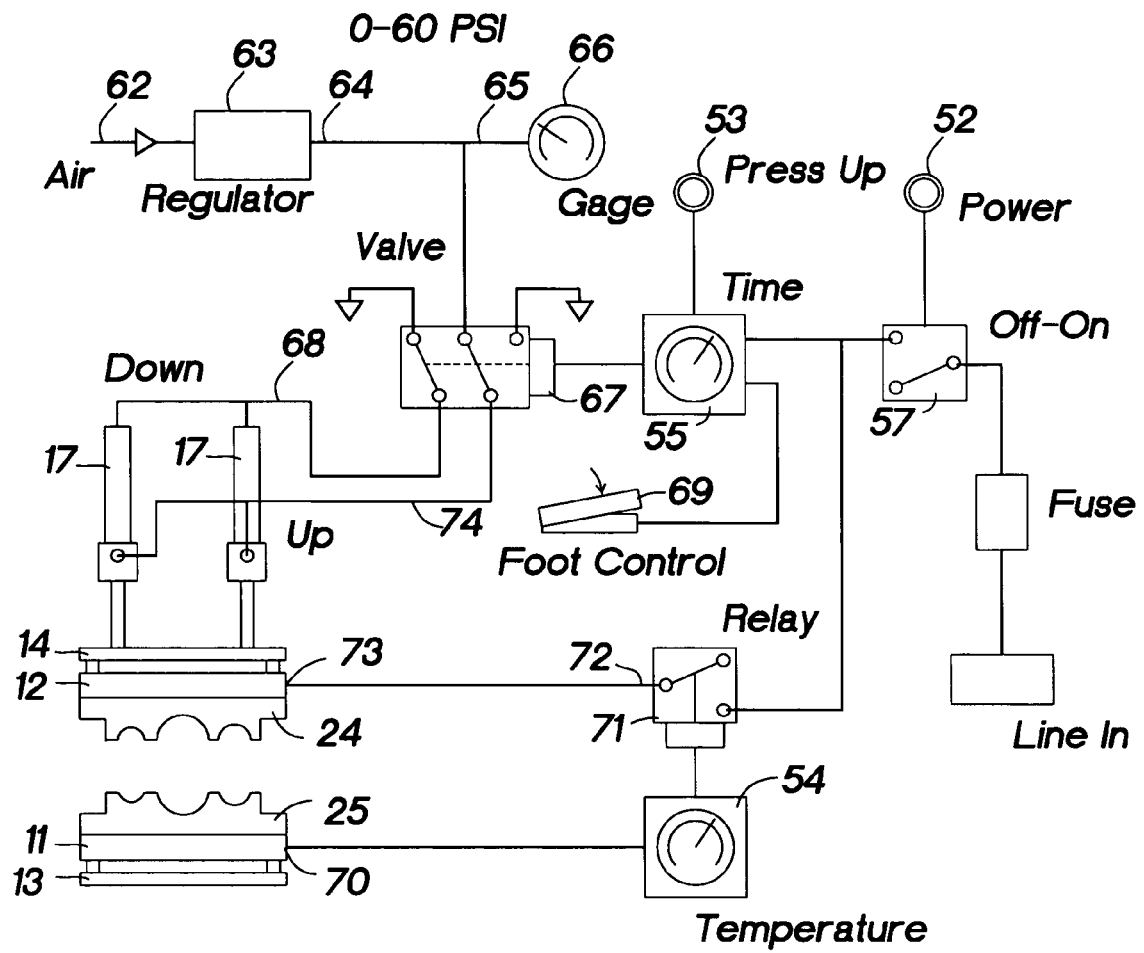
FIG. 4 is a system diagram, illustrating the sequential operation of the timing, temperature control and pneumatic circuit.

FIG. 4 is the System Diagram showing air flow 62, to pressure regulator 63, reduced outlet air pressure 64, flows through conduit 65, to gage 66 and valve 67. Foot control 69, when actuated starts the preset time controller 55, in turn actuating valve 67, allowing air pressure 64, through flexible conduit 68, to pressurize cylinders 17, thereby closing top die-set 24, against bottom die-set 25. The temperature controller 54, is preset to a desired temperature and is maintained by a signal from thermocouple 70, in turn the relay 71, cycles off and on sending voltage 72, to heaters 73, installed into heater blocks 11 and 12. After the timing is completed, the time control 55, opens the circuit to valve 67, permitting air pressure to flow in flexible conduit 74, raising the top die-set 24.

Figure 5A:
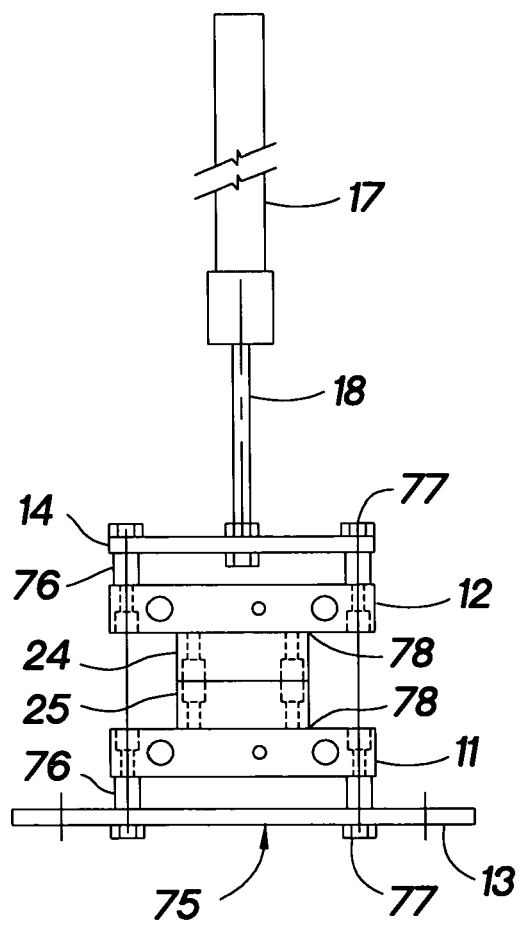
FIGS. 5A and 5B show the front and side views of the components installed into the die-set heater blocks.
Figure 5B:
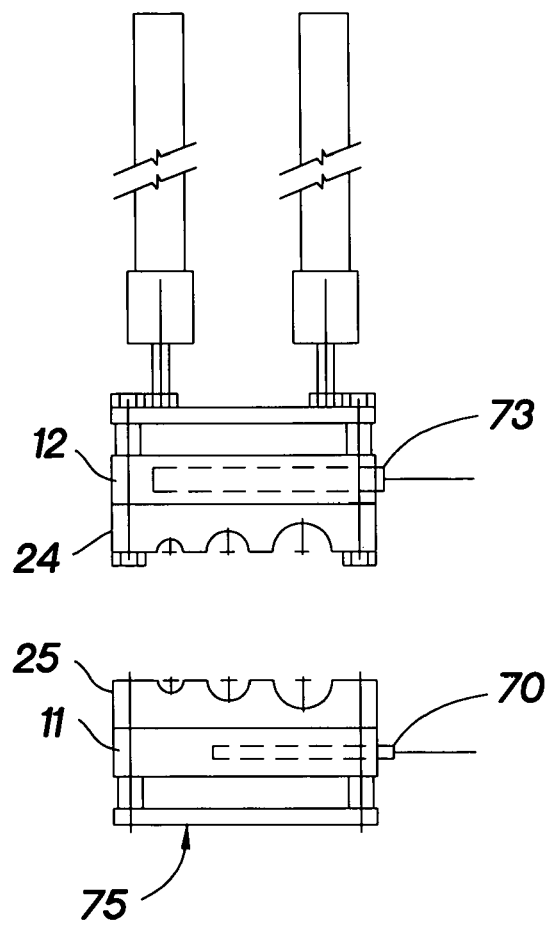

FIGS. 5A and 5B illustrate the side and front views of the die-set and heater block sub-assembly 75, thermocouple 70 is located in the heater block 11, heater 73 is shown in heater block 12. The upper plate 14 is attached to heater block 12, using spacers 76 and hardware 26 and nuts 77, similarly the lower plate 13 is attached to heater block 11, using spacers 76 and hardware 26 and nuts 77. In order to operate efficiently the die-sets 24 and 25, as well as heater blocks 11 and 12 are manufactured with a high thermal conductive alloy. Keeping the heat from being transmitted to the plates 13 and 14, the use of a low thermal conductive material is used for spacers 76. Further means of heat transfer from heaters 11 and 12 to die-sets 24 and 25 is the use of thermal compound 78.

FIG. 5A shows the press apparatus 10 in the closed position. The FIG. 5B shows the press apparatus 10 in the open position.

Figure 6A:
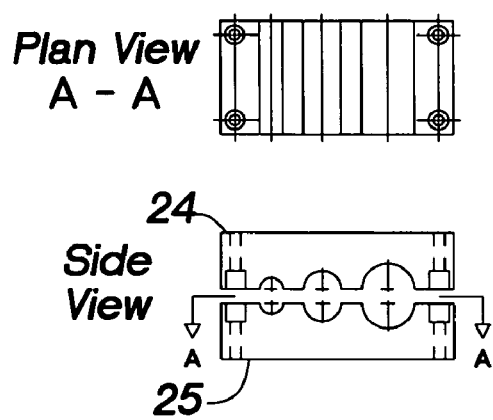
FIG. 6A shows a die-set design for use with round rubber cord stock.

FIG. 6A displays die-set 24 and 25, for use with common rubber cord stock, and a fabricated size of 2 inch by 4 inch.

Figure 6B:
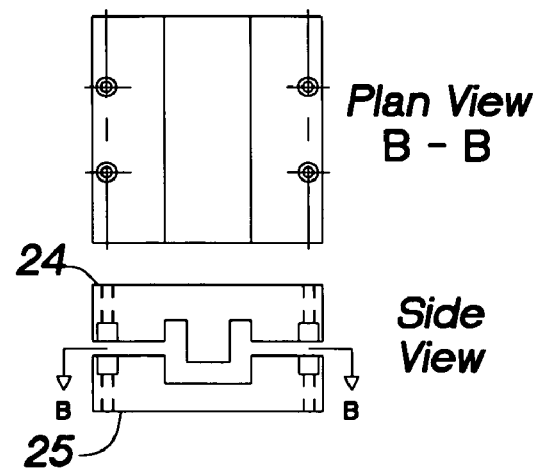
FIG. 6B pictures a die-set design for use with irregular extruded rubber.

FIG. 6B pictures die-set 24 and 25, for use with large or irregular rubber extrusions, and a dimensional square size of 4 inch by 4 inch.

Figure 6C:
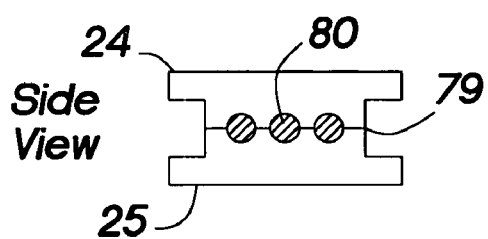
FIG. 6C illustrates a die-set in a normal face to face closure.

FIG. 6C illustrates die-set 24 and 25, in the normal face to face closure 79, containing the rubber cord 80, thereby permitting expansion of the elastomer to maintain pressure in the heated die-set 24 and 25. The force exerted allows good thermal transfer from die-set to the rubber cord 80.

Figure 6D:
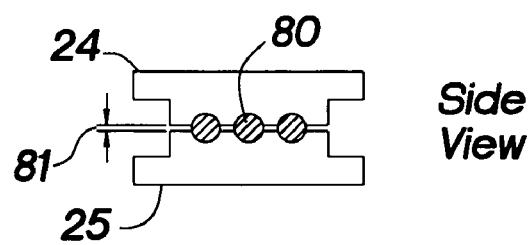
FIG. 6D depicts a die-set with a closure gap, allowing force from the air cylinders to keep pressure on the rubber cord during the bonding cycle.

FIG. 6D depicts a die-set 24 and 25, that does not have face to face closure, alternately a gap 81, allows force from the air cylinders 17, to always keep pressure on the rubber cord 80, permitting good thermal transfer from heated die-set 24 and 25.

Another embodiment of the invention is the use of small, easily replaceable, quick change die-sets.

Figure 7A:
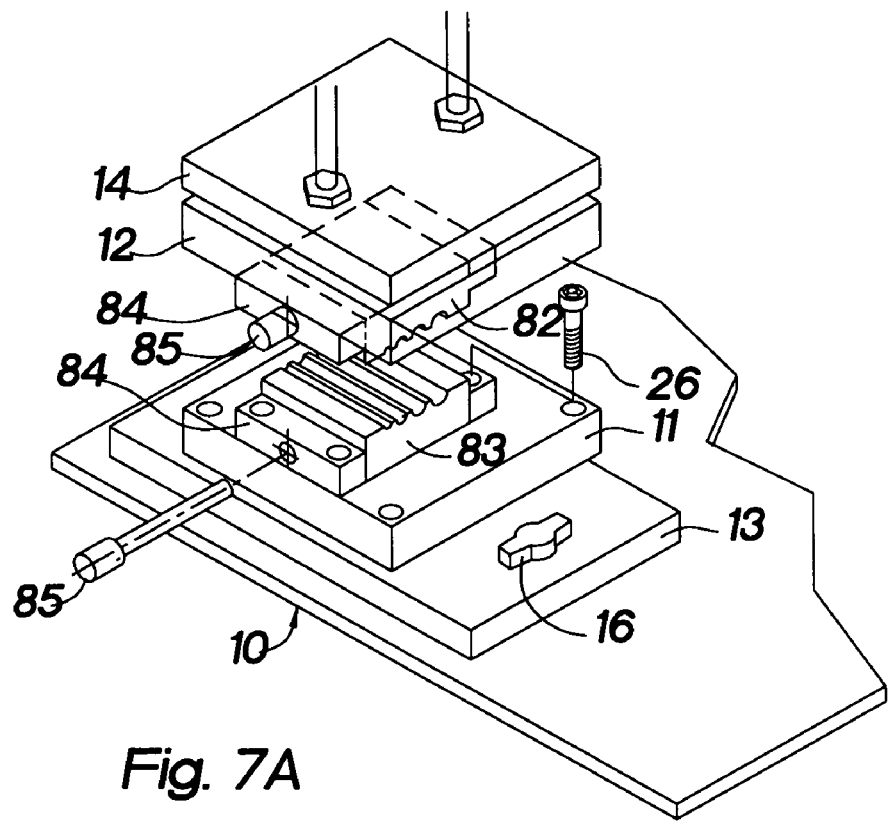
FIGS. 7A and 7B demonstrates a small quick change die-set configuration.

FIG. 7A depicts top die-set 82 and bottom die-set 83, secured by holding bars 84, to both heater blocks 11 and 12, using a plurality of hardware 26. A main feature is the use of removable guide pins 85, to permit an uncomplicated easy exchange of die-sets 82 and 83, with another die-set of alternate o-ring groove configuration.

Figure 7B:
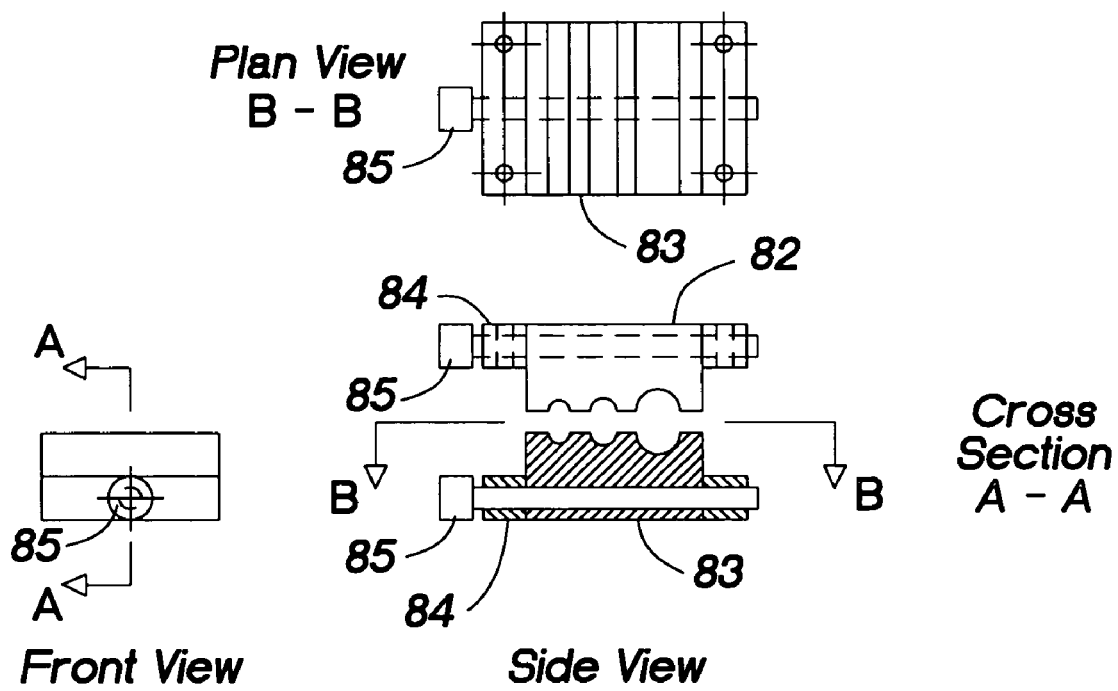

FIG. 7B shows parts described in FIG. 7A, in more detail, by drawings of side view, front view, plan view and cross section.

Figure 8A:
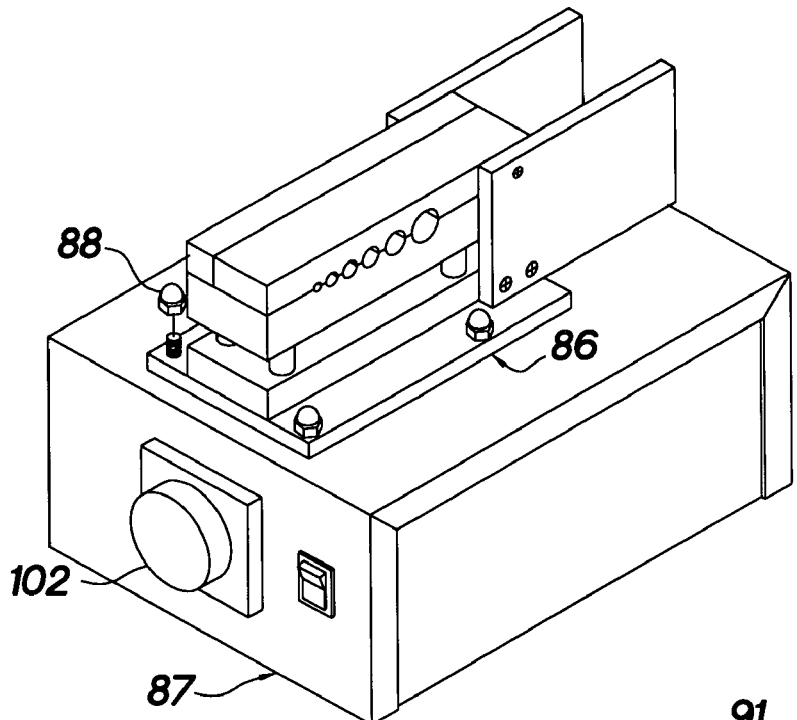
FIG. 8A is a perspective view of the portable apparatus.

FIG. 8A illustrates the perspective view of the Portable Apparatus with Die-set Module 86, securely fastened to the Electronic Control Module 87, using attaching means 88.

Figure 8B:
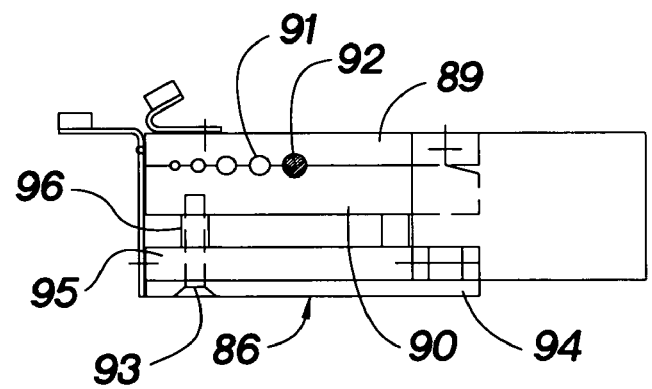
FIGS. 8B and 8C are side views of the portable apparatus, die-set closed and die-set open.

FIG. 8B displays the side view of die-set module 86, moveable heater block 89, fixed heater block 90. In order to operate efficiently the heater blocks 89 and 90 are manufactured with a high thermal conductive alloy. Cylindrical grooves 91, are consolidated into heater blocks 89 and 90, and contain the rubber cord 92. A plurality of fastener 93, is used to securely sandwich base plate 94, support block 95, and spacers 96 to fixed heater block 90. Keeping the heat from being transmitted to the support block 95, the use of low thermal conductive material is used for spacers 96 and fastener 93.

Figure 8C:
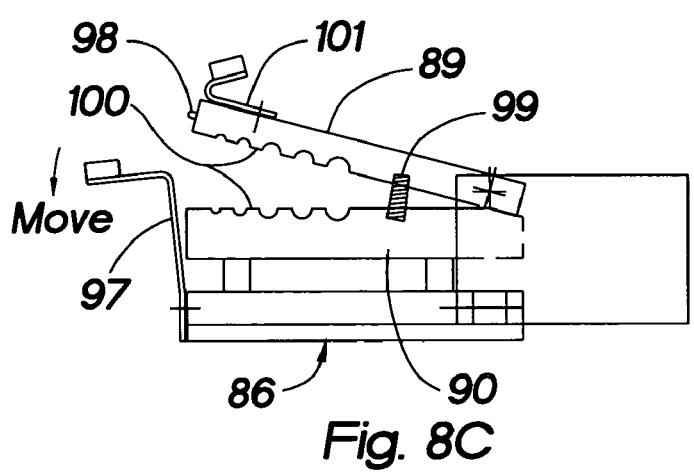

FIG. 8C depicts the heater blocks 89 and 90 in the open position. Depressing front spring 97, releases latch pin 98 located in the heater block 89, permitting the compression spring 99 to open an aperture 100, providing access for rubber cord 92. Upper spring 101, is used to close aperture 100.

Figure 9:
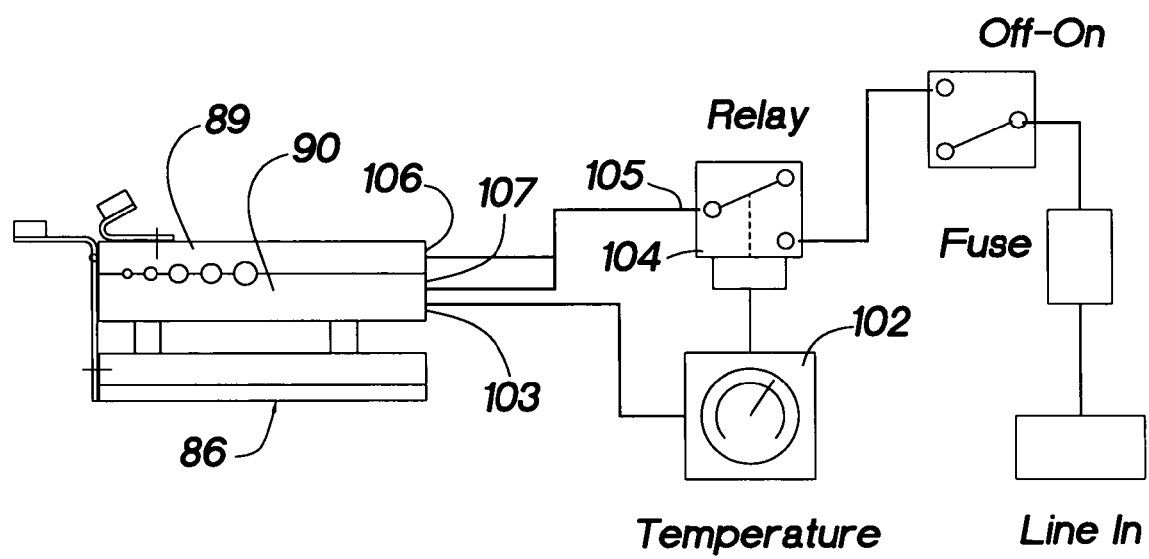
FIG. 9 is a system diagram of the portable apparatus, showing the temperature control circuit.
Figure 11:
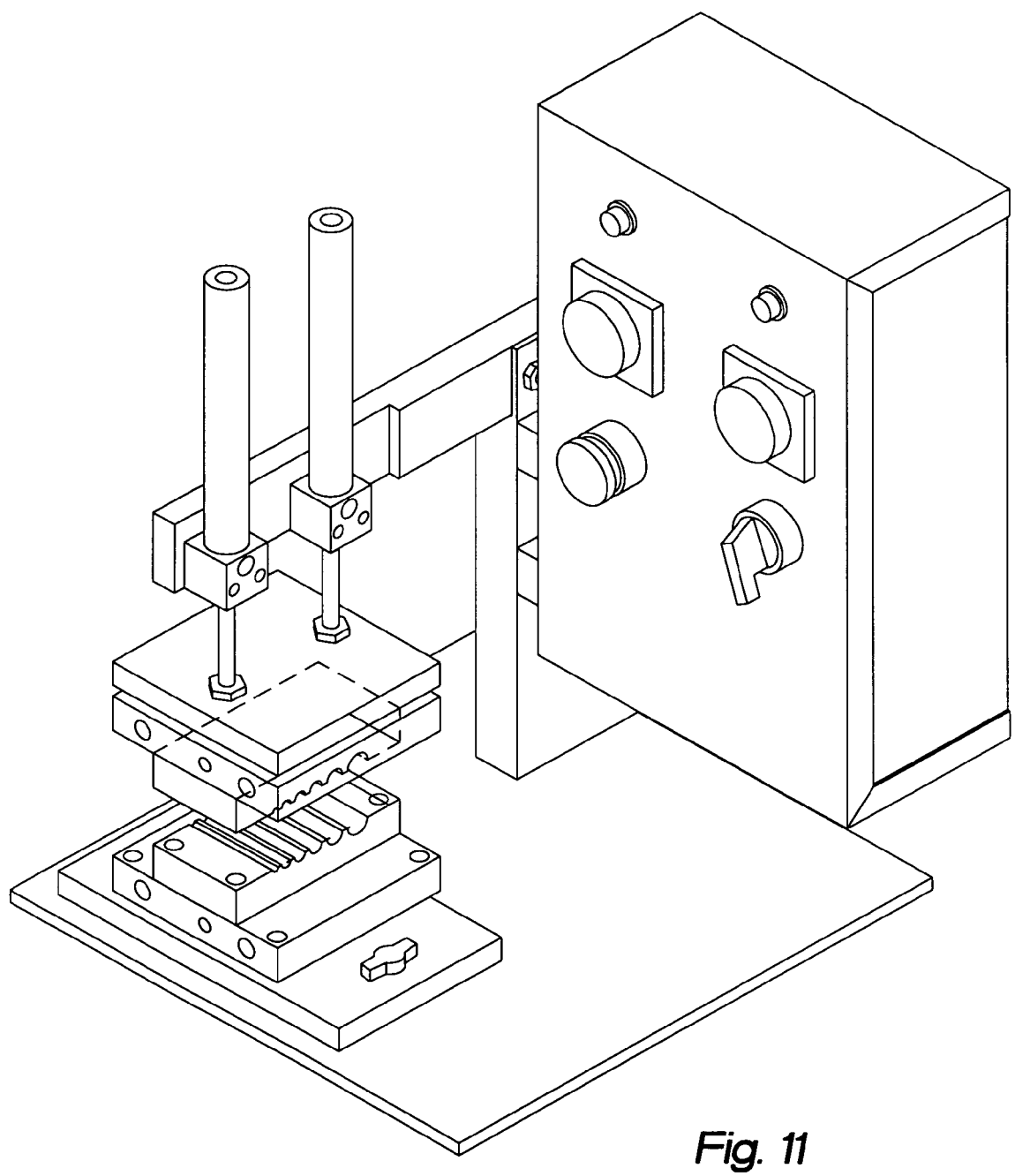
FIG. 11 is the front page view, the invention in perspective.

FIG. 9 is the system diagram showing the electrical wiring and components. The temperature controller 102, is preset to a desired temperature and is maintained by a signal from thermocouple 103, installed in heater block 90, in turn the relay 104, cycles off and on sending voltage 105, to heaters 106 and 107, positioned in the heater blocks 89 and 90, keeping them at a steady preset temperature.

FIG. 10A pictures die-set 108 and 109, for use with a large irregular extrusion 110, featured in plan view and front view is a machined slot 111, that provides peripheral clearance around the extrusion 110, when said extrusion 110, is butt joined within the die-set 108 and 109. The clearance provided by the machined slot 111, prevents bonding compound 112, on each end of extrusion 110, from adhering to inner surface 113, of the die-set 108 and 109.

FIG. 10B depicts closed die-set 114 and 115, fabricated with moveable side walls 116, for use with rubber extrusion 117. Side walls 116, are attached to the base 119, with hinges 118, providing a collapsible means in order to remove the bonded rubber extrusion 117.

FIG. 10C shows die-set 114 and 115, in the open position, for removal of the rubber extrusion 117. Side walls 116, are rotated from the vertical position by the function of hinges 118, allowing die clearance for rubber extrusion 117, permitting easy removal.

The invention claimed is:

1. Apparatus for bonding rubber o-rings or extrusions comprising:
    a press base to be mounted on a tabletop;
    a bottom die-set connected to the base;
    a top die-set operatively aligned with the bottom die-set, the top and bottom die sets being removable and configurable to permit bonding different rubber o-ring or extrusion cross sections;
    a pair of air operated cylinders coupled to the top die set to provide relative motion with respect to the bottom die set to apply pressure to the rubber o-ring or extrusion;
    a pair of heater blocks for heating the die-sets to a set temperature to allow the rubber o-ring or extrusion ends to be bonded together when the heated top and bottom die-sets are in a closed attitude to contact the rubber o-ring or extrusion material; and
    an electronic module comprising temperature and timing controls.

2. Apparatus for bonding rubber o-rings or extrusions according to claim 1, wherein said air cylinders are adjustable for controlling the pressure to the die-sets that securely clamp the said rubber o-rings or extrusions.

3. Apparatus for bonding rubber o-rings or extrusions according to claim 1, wherein said controllable temperature device is used for maintaining a constant heating of the die-sets that securely clamp the said rubber o-rings or extrusions.

4. Apparatus for bonding rubber o-rings or extrusions according to claim 1, wherein said timing module is used for limiting the duration of the die-set closure that securely clamps the said rubber o-rings or extrusions.

5. Apparatus for bonding rubber o-rings or extrusions according to claim 1, wherein an electrical foot switch enables the die-set closure operation that securely clamps the said rubber o-rings or extrusions.

6. Apparatus for bonding rubber o-rings or extrusions according to claim 1, wherein said die-sets accommodate the said rubber o-ring or extrusions permitting the heated rubber to expand while retaining it in the die-sets.

7. Apparatus for bonding rubber o-rings or extrusions according to claim 1, wherein said die-sets maintain a gap between die-set faces allowing pressure from said air cylinders to always keep pressure on said rubber o-rings or extrusions.

8. Apparatus for bonding rubber o-rings or extrusions according to claim 2, wherein said air cylinders are adjustable to minimize die-set indentations of the said rubber o-rings or rubber extrusions.

9. Apparatus for bonding rubber o-rings or extrusions according to claim 2, wherein said air cylinders are adjustable to compensate for plus or minus dimensional tolerances of the said rubber o-rings or extrusions.

10. Apparatus for bonding rubber o-rings or extrusions according to claim 2, wherein said air cylinders are adjustable to compensate for hardness tolerances of the said rubber o-rings or extrusions.

11. Apparatus for bonding rubber o-rings or extrusions according to claim 1, wherein said die-sets are configured to permit quick change of the die-sets allowing easy switching for another size of o-ring or extrusion and includes removable guide pins to permit an uncomplicated exchange of the die-sets.

12. Apparatus for bonding rubber o-rings or extrusions according to claim 1, wherein said die-sets include a machined slot which provides peripheral clearance around the said rubber o-ring or extrusion to prevent bonding compound from adhering to the inner surfaces of the die-sets.

13. Apparatus for bonding rubber o-rings or extrusions according to claim 1, wherein said die-sets include movable side walls allowing effortless removal of irregular shaped o-rings or extrusions.

14. Portable apparatus for bonding rubber o-rings comprising:
   a heated die-set module including:
      a fixed lower heater block;
      a movable upper heater block;
      a base plate connected to the lower heater block by a plurality of fasteners and spacers;
      a pivotal connection between the upper and lower heater blocks;
      a compression spring positioned between the upper and lower heater blocks;
      wherein each of the upper and lower heater blocks includes a plurality of grooves of different sizes for accommodating o-rings of different diameters;
      the portable apparatus further includes an electronic module comprising a temperature control.

15. Portable apparatus for bonding rubber o-rings according to claim 14, wherein said heated die-set module includes a spring and latch to permit closing and locking of the die-set module.

16. Portable apparatus for bonding rubber o-rings according to claim 14, wherein said compression spring quickly opens said die-set when a latch is released thereby permitting access to the bonded o-ring.

17. Portable apparatus for bonding rubber o-rings according to claim 14, wherein said heated die-set module maintains a gap between die-set faces allowing spring pressure to always keep pressure on the said rubber o-rings.

18. Portable apparatus for bonding rubber o-rings according to claim 14, wherein adjustable spring pressure minimizes die-set indentations of the said rubber o-rings.

19. Portable apparatus for bonding rubber o-rings according to claim 14, wherein adjustable spring pressure compensates for plus or minus dimensional tolerances of the said rubber o-rings.

20. Portable apparatus for bonding rubber o-rings according to claim 14, wherein said electronic module is used for maintaining constant heating of the die-set module.

* * * * *